Patented Oct. 25, 1932

1,884,790

UNITED STATES PATENT OFFICE

JAMES E. McCONKIE, OF PORTLAND, OREGON, AND ROGER H. LUECK, OF SAN FRANCISCO, CALIFORNIA, ASSIGNORS TO AMERICAN CAN COMPANY, OF NEW YORK, N. Y., A CORPORATION OF NEW JERSEY

CORROSION INHIBITION

No Drawing. Application filed August 2, 1929. Serial No. 383,170.

The present invention relates to a method of restraining, retarding or inhibiting internal corrosion or corrosion failures in hermetically sealed metallic containers used in canning fruit and other food products.

Corrosion or corrosion failures in the interior of tin cans sometimes take place under certain canning conditions and these failures have been particularly noted with certain acid products, or products having an acid reaction on the container. One result of such acid corrosion is the liberation of hydrogen within the can which in certain quantities produces what is known as "hydrogen springers" and these in the more exaggerated cases become "hydrogen swells." Such results make the can unmerchantable because of its swollen appearance. Another form of corrosion failure relates to what is known as "pitting" or "perforation" of the metal in containers. While this latter result is somewhat different in character from that produced by the development of hydrogen within the can, it nevertheless may be properly considered as local corrosion and this, also, affects the merchantability of the canned product.

The present invention contemplates the use of an inhibitor which may be an edible colloidal or protein substance which may be introduced into the can with the liquid, as in the case of fruit packed in liquid, or it may be otherwise added to the product. This substance may, also, be embodied in a lining applied to the interior walls of a container in the form of a thin film which may or may not be dried previous to filling the contents into the can. When embodied in a can lining, the inhibiting substance dissipates into the product in such a state as to be capable of affording protection against corrosion.

In practicing the present invention, the fruit is filled into the container and the cover is applied and hermetically sealed in the usual manner. In embodying the substance in a lining, the can would be lined in any or usual preferred manner prior to the filling and sealing operations.

The inhibitor at present preferred is gelatine. It has been found that small quantities of gelatine (in amounts equalling a fraction of one per cent) added to those acid fruit products, for example, which normally corrode the container and which otherwise may develop into corrosion failures, have a pronounced deterring effect upon the rate of development of these failures and under ideal conditions thoroughly restrain such corrosion.

It has been found that gelatine answers all of the requirements of a corrosion inhibitor in canned foods, a highly important characteristic being its capacity of withstanding high temperatures without coagulating, these high temperatures being necessary in the processing or sterilizing of certain food products. It is safely edible and without effect upon the taste or odor of the contents of the cans.

It is thought that the invention and many of its attendant advantages will be understood from the foregoing disclosure, and it will be apparent that various changes may be made in the method disclosed without departing from the spirit and scope of the invention or sacrificing all of its advantages, the procedure hereinbefore described being merely a preferred embodiment thereof.

We claim:

1. The method of inhibiting internal corrosion in hermetically sealed metallic containers containing solid food matter immersed in liquid, which comprises the addition of minute quantities of gelatine to the product sealed within the container.

2. The method of inhibiting internal corrosion in hermetically sealed metallic containers containing solid food matter immersed in liquid, which comprises lining the interior of a metallic container with a coating containing gelatine, filling a product into the lined container and hermetically sealing.

JAMES E. McCONKIE.
ROGER H. LUECK.